US008547026B2

(12) United States Patent
Lin et al.

(10) Patent No.: US 8,547,026 B2
(45) Date of Patent: Oct. 1, 2013

(54) LED BACKLIGHT DRIVING CIRCUIT AND DISPLAY DEVICE

(75) Inventors: Po-Shen Lin, Shenzhen (CN); Liang-Chan Liao, Shenzhen (CN); Xin-Ming Gao, Shenzhen (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 146 days.

(21) Appl. No.: 13/381,366

(22) PCT Filed: Nov. 3, 2011

(86) PCT No.: PCT/CN2011/081710
§ 371 (c)(1), (2), (4) Date: Dec. 28, 2011

(87) PCT Pub. No.: WO2013/060038
PCT Pub. Date: May 2, 2013

(65) Prior Publication Data
US 2013/0107165 A1    May 2, 2013

(30) Foreign Application Priority Data
Oct. 28, 2011    (CN) .................... 2011 2 0418555 U

(51) Int. Cl.
*H05B 37/02*    (2006.01)

(52) U.S. Cl.
USPC ............ 315/192; 315/297; 315/307; 315/312

(58) Field of Classification Search
USPC ................ 315/192, 151, 224, 294, 297, 307, 315/308, 312; 345/101, 102
See application file for complete search history.

(56) References Cited

U.S. PATENT DOCUMENTS

| 6,285,139 | B1* | 9/2001 | Ghanem | 315/291 |
| 7,919,936 | B2* | 4/2011 | Liu et al. | 315/307 |
| 8,044,609 | B2* | 10/2011 | Liu | 315/291 |
| 8,106,603 | B2* | 1/2012 | Huang et al. | 315/297 |
| 8,120,288 | B2* | 2/2012 | Liu et al. | 315/320 |
| 8,350,496 | B2* | 1/2013 | Peting et al. | 315/291 |
| 8,456,098 | B2* | 6/2013 | Peting et al. | 315/227 R |
| 2012/0049761 | A1* | 3/2012 | Yu et al. | 315/294 |
| 2013/0044272 | A1* | 2/2013 | Gao | 349/61 |
| 2013/0093355 | A1* | 4/2013 | Han | 315/294 |

* cited by examiner

*Primary Examiner* — Vibol Tan
(74) *Attorney, Agent, or Firm* — Cheng-Ju Chiang

(57) ABSTRACT

The present invention provides a display device and an LED backlight driving circuit thereof. The LED backlight driving circuit includes a plurality of LED light strings connected in parallel; a switch module including switches; a power module, and a switching control module. The switching control module includes: a driving unit connected to the switches; a current detection unit connected to the switches; an ON time detection unit connected to the driving unit; a reference unit, the reference unit supplying a reference value; multipliers, each of which has two input terminals respectively connected to the ON time detection unit and the current detection unit to receive a ON time value of a corresponding one of the switches and a voltage signal indicating the current of the switch; and comparison units, each of which has two input terminals respectively connected to the reference unit and an output terminal of a corresponding one of the multipliers. Each of the comparison units has an output terminal connected to the driving unit. The driving unit controls the ON time of the switch corresponding to the comparison unit according to an output result of the comparison unit.

16 Claims, 2 Drawing Sheets

LED BACKLIGHT DRIVING CIRCUIT AND DISPLAY DEVICE

BACKGROUND OF THE INVENTION

1. Field of the Invention

The present invention relates to displaying techniques, and in particular to an LED (Light-Emitting Diode) backlight driving circuit and a display device incorporating the LED backlight driving device.

2. The Related Arts

Recently, displaying techniques undergo fast development and become a hot spot of research. An LED backlight control circuit of display devices in the prior art comprises: a power module, a plurality of LED light strings, a switching control module, and switches, in which the power module supplies power to the plurality of LED light strings and the switches are respectively connected to the LED light strings. The switching control module controls a gate voltage of each switch in order to control the electrical current of each LED light string so as to make the currents of the LED light strings identical thereby providing the LED light strings with identical brightness.

However, in the prior art, a high voltage is applied to the switches when the switches are operating in an operation zone of high impedance, and this leads to increased losses of the switches, causing a waste of energy and generating excessive heat that results in an issue of high temperature in a product and thus affecting stability of the product.

Thus, it is desired to have an improved LED backlight driving circuit and a display device so as to overcome the above problems.

SUMMARY OF THE INVENTION

The present invention is to provide an LED backlight driving circuit and a display device that reduce the voltage applied to a switch and thus lower loss of the switch.

The present invention provides an LED backlight driving circuit, comprising: a number of LED light strings connected in parallel; a switch module, which comprises the same number of switches as the LED light strings, the switches being arranged to respectively correspond to and connect in series with the LED light strings; a power module, which is electrically connected to the LED light strings; and a switching control module, which controls currents of the LED light strings. The switching control module comprises: a driving unit, which is connected to the switches; a current detection unit, which is connected to the switches to detect the currents of the switches; an ON time detection unit, which is connected to the driving unit to detect an ON time of each of the switches; a reference unit, the reference unit supplying a reference value; multipliers of the same number as the LED light strings, each of the multipliers having two input terminals respectively the ON time detection unit and the current detection unit to receive a ON time value of a corresponding one of the switches and a voltage signal indicating the current of the switch; comparison units of the same number as the LED light strings, each of the comparison units having two input terminals respectively connected to the reference unit and an output terminal of a corresponding one of the multipliers, each of the comparison units having an output terminal connected to the driving unit, the driving unit controlling the ON time of the switch corresponding to the comparison unit according to an output result of the comparison unit; and current detection resistors, the current detection resistors being of a number corresponding to the number of the switches and being respectively connected in series to the switches, wherein the reference unit comprises: a constant current source that supplies a constant electrical current, a resistor connected to an input terminal of the constant current source, a period unit that supplies a period value for the driving unit to drive the switches, and a multiplication unit, an output terminal of the constant current source and an output terminal of the period unit being respectively connected to two input terminals of the multiplication unit, the multiplication unit having an output terminal serving as an output terminal of the reference unit and connected to each of the comparison units.

According to a preferred embodiment of the present invention, the power module comprises: a power supply, an electrical inductor, a control switch, a diode, and a PWM control unit, wherein the electrical inductor has an end connected to the power supply and the electrical inductor has an opposite end connected to a positive terminal of the diode, the diode having a negative terminal connected to the LED light strings; and the control switch has a drain terminal connected between a positive terminal of the diode and the electrical inductor, the control switch having a source terminal that is grounded and a gate terminal that is connected to an output terminal of the PWM control unit.

According to a preferred embodiment of the present invention, the power module further comprises: a minimum voltage detection unit for detecting a minimum voltage of the LED light strings; an operational amplification circuit; and a reference voltage unit; wherein an output terminal of the minimum voltage detection unit and an output terminal of the reference voltage unit are respectively connected to two input terminals of the operational amplification circuit, the operational amplification circuit having an output terminal connected to an input terminal of the PWM control unit.

The present invention provides an LED backlight driving circuit, which comprises: a number of LED light strings connected in parallel; a switch module, which comprises the same number of switches as the LED light strings, the switches being arranged to respectively correspond to and connect in series with the LED light strings; a power module, which is electrically connected to the LED light strings; and a switching control module, which controls currents of the LED light strings; wherein the switching control module comprises: a driving unit, which is connected to the switches; a current detection unit, which is connected to the switches to detect the currents of the switches; an ON time detection unit, which is connected to the driving unit to detect an ON time of each of the switches; a reference unit, the reference unit supplying a reference value; multipliers of the same number as the LED light strings, each of the multipliers having two input terminals respectively the ON time detection unit and the current detection unit to receive a ON time value of a corresponding one of the switches and a voltage signal indicating the current of the switch; and comparison units of the same number as the LED light strings, each of the comparison units having two input terminals respectively connected to the reference unit and an output terminal of a corresponding one of the multipliers, each of the comparison units having an output terminal connected to the driving unit, the driving unit controlling the ON time of the switch corresponding to the comparison unit according to an output result of the comparison unit. According to a preferred embodiment of the present invention, the reference unit comprises: a constant current source that supplies a constant electrical current; an electrical resistor, which is connected to an input terminal of the constant current source; a period unit, which supplies a period value for the driving unit to drive the switches; and a multiplication unit, an output terminal of the constant current source and an output terminal of the period unit being respectively connected to two input terminals of the multiplication unit, the multiplication unit having an output terminal serving as an output terminal of the reference unit and connected to each of the comparison units.

According to a preferred embodiment of the present invention, the LED backlight driving circuit further comprises current detection resistors, and the current detection resistors are of a number corresponding to the number of the switches and being respectively connected in series to the switches.

According to a preferred embodiment of the present invention, the switches comprise N-channel MOS transistors.

According to a preferred embodiment of the present invention, the power module comprises: a power supply, an electrical inductor, a control switch, a diode, and a PWM control unit, wherein the electrical inductor has an end connected to the power supply and the electrical inductor has an opposite end connected to a positive terminal of the diode, the diode having a negative terminal connected to the LED light strings; and the control switch has a drain terminal connected between a positive terminal of the diode and the electrical inductor, the control switch having a source terminal that is grounded and a gate terminal that is connected to an output terminal of the PWM control unit.

According to a preferred embodiment of the present invention, the power module further comprises: a minimum voltage detection unit for detecting a minimum voltage of the LED light strings; an operational amplification circuit; and a reference voltage unit; wherein an output terminal of the minimum voltage detection unit and an output terminal of the reference voltage unit are respectively connected to two input terminals of the operational amplification circuit, the operational amplification circuit having an output terminal connected to an input terminal of the PWM control unit.

The present invention provides a display device, which comprises a display panel and an LED backlight driving circuit. The LED backlight driving circuit comprises: a number of LED light strings connected in parallel; a switch module, which comprises the same number of switches as the LED light strings, the switches being arranged to respectively correspond to and connect in series with the LED light strings; a power module, which is electrically connected to the LED light strings; and a switching control module, which controls currents of the LED light strings; wherein the switching control module comprises: a driving unit, which is connected to the switches; a current detection unit, which is connected to the switches to detect the currents of the switches; an ON time detection unit, which is connected to the driving unit to detect an ON time of each of the switches; a reference unit, the reference unit supplying a reference value; multipliers of the same number as the LED light strings, each of the multipliers having two input terminals respectively the ON time detection unit and the current detection unit to receive a ON time value of a corresponding one of the switches and a voltage signal indicating the current of the switch; and comparison units of the same number as the LED light strings, each of the comparison units having two input terminals respectively connected to the reference unit and an output terminal of a corresponding one of the multipliers, each of the comparison units having an output terminal connected to the driving unit, the driving unit controlling the ON time of the switch corresponding to the comparison unit according to an output result of the comparison unit.

According to a preferred embodiment of the present invention, the reference unit comprises: a constant current source that supplies a constant current; a resistor, which is connected to an input terminal of the constant current source; a period unit, which supplies a period value for the driving unit to drive the switches; and a multiplication unit, an output terminal of the constant current source and an output terminal of the period unit being respectively connected to two input terminals of the multiplication unit, the multiplication unit having an output terminal serving as an output terminal of the reference unit and connected to each of the comparison units.

According to a preferred embodiment of the present invention, the LED backlight driving circuit further comprises current detection resistors, and the current detection resistors are of a number corresponding to the number of the switches and being respectively connected in series to the switches.

According to a preferred embodiment of the present invention, the switches comprise N-channel MOS transistors.

According to a preferred embodiment of the present invention, the power module comprises: a power supply, an electrical inductor, a control switch, a diode, and a PWM control unit, wherein the electrical inductor has an end connected to the power supply and the electrical inductor has an opposite end connected to a positive terminal of the diode, the diode having a negative terminal connected to the LED light strings; and the control switch has a drain terminal connected between a positive terminal of the diode and the electrical inductor, the control switch having a source terminal that is grounded and a gate terminal that is connected to an output terminal of the PWM control unit.

According to a preferred embodiment of the present invention, the power module further comprises: a minimum voltage detection unit for detecting a minimum voltage of the LED light strings; an operational amplification circuit; and a reference voltage unit; wherein an output terminal of the minimum voltage detection unit and an output terminal of the reference voltage unit are respectively connected to two input terminals of the operational amplification circuit, the operational amplification circuit having an output terminal connected to an input terminal of the PWM control unit.

According to a preferred embodiment of the present invention, the display device comprises a liquid crystal display device.

The efficacy of the present invention is that to be distinguished from the prior art, the present invention provides an LED backlight driving circuit and a display device, which vary the effective current of an LED light string by controlling the ON time of a control switch and switches are put in operation in switching condition of high driving voltage and low impedance so as to reduce the voltage applied by the switches thereby reducing losses of the first switch and the second switch.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
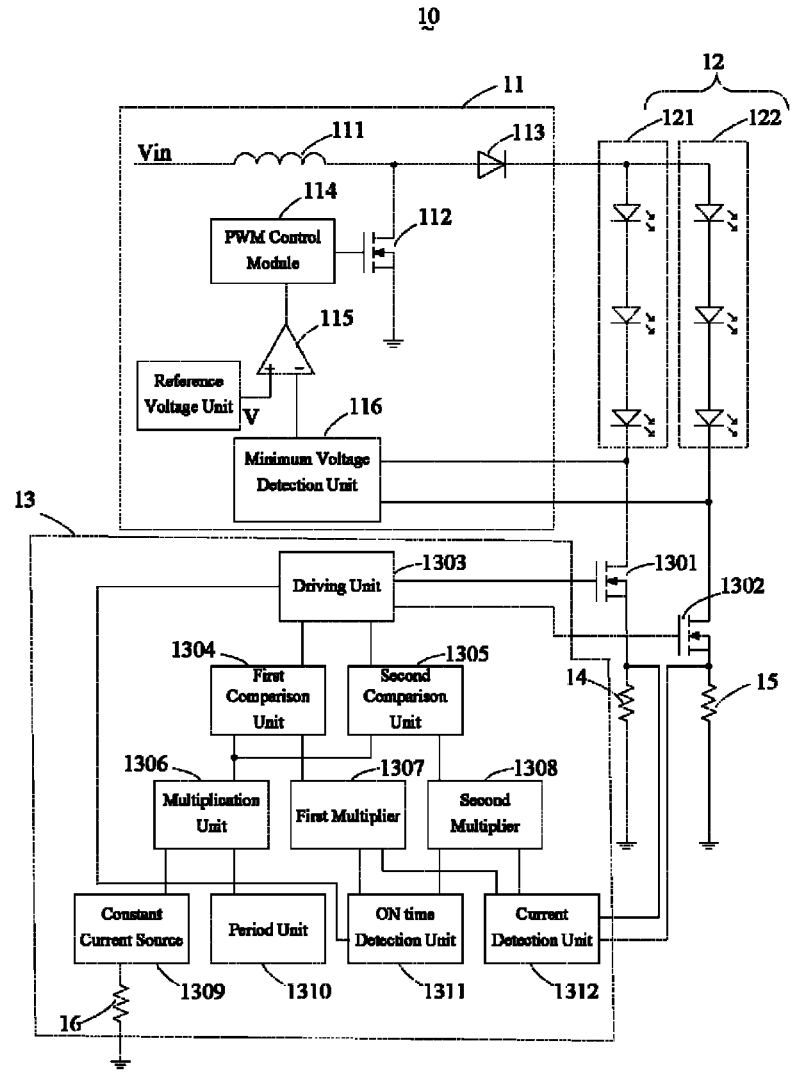
FIG. 1 is a schematic view showing an LED (Light-Emitting Diode) backlight driving circuit according to a preferred embodiment of the present invention.

Referring to FIG. 1, FIG. 1 is a schematic view of an LED (Light-Emitting Diode) backlight driving circuit according to a preferred embodiment of the present invention. As shown in FIG. 1, the LED backlight driving circuit 10 according to the present invention comprises: a power module 11, an LED light string assembly 12, a switching control module 13, and a switch module (not labeled). In the embodiment, the switch module comprises a first switch 1301 and a second switch 1302.

The LED light string assembly 12 comprises a first LED light string 121 and a second LED light string 122 that are connected in parallel. The first switch 1301 is connected in series with the first LED light string 121 and the second switch 1302 is connected in series with the second LED light string 122.

In the embodiment, the power module 11 is electrically connected to the LED light string assembly 12 and comprises: a power supply (not shown), an electrical inductor 111, a control switch 112, a diode 113, a PWM (Pulse Width Modulation) control unit 114, an operational amplification circuit 115, a reference voltage unit (not labeled), and a minimum voltage detection unit 116.

The electrical inductor 111 has an end connected to the power supply to receive a voltage Vin from the power supply and the electrical inductor 111 has an opposite end connected to a positive terminal of the diode 113. The diode 113 has a negative terminal connected to a positive terminal of the LED light string assembly 12. The control switch 112 has a drain terminal that is connected between the diode 113 and the electrical inductor 111. The control switch 112 has a source terminal that is grounded. The control switch 112 has a gate terminal that is connected to the PWM control unit 114, and the PWM control unit 114 supplies a corresponding driving signal to the gate of the control switch 112 to conduct the control switch 112 on or off. Specifically, when the control switch 112 is conducted on, the electrical inductor 111 accumulates energy and the diode 113 prevents a reverse flow caused by the voltage of the LED light string assembly 12; when the control switch 112 is set off, the electrical inductor 111 discharges energy and the diode 113 provides a function of rectification.

The minimum voltage detection unit 116 has an input terminal that is connected to a negative terminal of the LED light string assembly 12 to detect the minimum voltage of the LED light string assembly 12. The minimum voltage detection unit 116 has an output terminal that is connected to an inverting input terminal of the operational amplification circuit 115 to supply the minimum voltage to the operational amplification circuit 115. The operational amplification circuit 115 has a non-inverting input terminal that is connected to an output terminal of the reference voltage unit to receive a reference voltage V. The operational amplification circuit 115 has an output terminal that is connected to an input terminal of the PWM control unit 114. The operational amplification circuit 115 varies a voltage at the output terminal thereof according to the minimum voltage detected and supplied by the minimum voltage detection unit 116 to the inverting input terminal thereof. If the minimum voltage detected by the minimum voltage detection unit 116 is lower than the reference voltage V, then the operational amplification circuit 115 increases the voltage at the output terminal thereof and the PWM duty cycle of the PWM control unit 114 increases, so that the voltage applied to the positive terminal of the LED light string assembly 12 increases to ensure the LED light string assembly 12 can be conducted on and a sufficient ON current is provided.

The switching control module 13 functions to control the electrical current of the LED light string assembly 12 in order to achieve identical brightness between the first LED light string 121 and the second LED light string 122. In the embodiment, the switching control module 13 comprises: a driving unit 1303, a first comparison unit 1304, a second comparison unit 1305, a first multiplier 1307, a second multiplier 1308, a reference unit (not labeled), an ON time detection unit 1311, and a current detection unit 1312. In the embodiment, the reference unit supplies a reference value for the switching control module 13 and the reference unit comprises a constant current source 1309, a period unit 1310, a resistor 16, and a multiplication unit 1306.

The driving unit 1303 is connected to both the first switch 1301 and the second switch 1302.

Specifically, the first switch 1301 has a gate terminal that is connected to the driving unit 1303, the first switch 1301 has a drain terminal that is connected to the negative terminal of the first LED light string 121, and the first switch 1301 has a source terminal that is connected to an input terminal of the current detection unit 1312. The source terminal of the first switch 1301 is further connected to an end of the first current detection resistor 14, while an opposite end of the first current detection resistor 14 is grounded.

Similarly, the second switch 1302 has a gate terminal connected to the driving unit 1303, the second switch 1302 has a drain terminal connected to the negative terminal of the second LED light string 122, and the second switch 1302 has a source terminal connected to an input terminal of the current detection unit 1312. The source terminal of the second switch 1302 is further connected to an end of the second current detection resistor 15, while an opposite end of the second current detection resistor 15 is grounded.

The constant current source 1309 functions to supply a constant electrical current. The constant current source 1309 is connected to the driving resistor 16. The driving resistor 16 has an end connected to the constant current source 1309 and an opposite end grounded.

The period unit 1310 functions to supply a period value for the driving unit 1303 to drive the switches.

The constant current supplied from the constant current source 1309 flows through the resistor 16 to generate a reference voltage signal Vr, which is connected, together with an output terminal of the period unit 1310, to two input terminals of the multiplication unit 1306. The multiplication unit 1306 has an output terminal that serves as an output terminal of the reference unit to supply a reference value.

The current detection unit 1312 is connected to both the first switch 1301 and the second switch 1302 to detect currents on the branch lines on which the switches are set. The ON time detection unit 1311 is connected to the driving unit 1303 and detects the ON times of the first switch 1301 and the second switch 1302.

The ON time value of the first switch 1301 supplied from the ON time detection unit 1311 and a voltage signal that is supplied from the current detection unit 1312 to indicate the current of the first switch 1301 are respectively connected to two input terminals of the first multiplier 1307. The output terminal of the multiplication unit 1306 and an output terminal of the first multiplier 1307 are respectively connected to two input terminals of the first comparison unit 1304 and an output terminal of the first comparison unit 1304 is connected to the driving unit 1303. The driving unit 1303 controls the gate voltage of the first switch 1301 according to the result of operation of the first comparison unit 1304 in order to adjust the ON time of the first switch 1301.

Similarly, the ON time value of the second switch 1302 supplied from the ON time detection unit 1311 and a voltage signal that is supplied from the current detection unit 1312 to indicate the current of the second switch 1302 are respectively connected to two input terminals of the second multiplier 1308. The output terminal of the multiplication unit 1306 and an output terminal of the second multiplier 1308 are respectively connected to two input terminals of the second comparison unit 1305, and an output terminal of the second comparison unit 1305 is connected to the driving unit 1303. The driving unit 1303 controls the gate voltage of the second switch 1302 according to the result of operation of the second comparison unit 1305 in order to adjust the ON time of the second switch 1302.

Specifically, the operation of the LED backlight driving circuit 10 according to the present invention is as follows:

The constant current source 1309 supplies a constant current that flows through the resistor 16 to generate the reference voltage signal Vr. The period unit 1310 provides the period value T for the driving unit 1303 to drive the first switch 1301. The reference voltage signal Vr and the period value T are fed to the multiplication unit 1306, and the result of operation of the multiplication unit 1306 is used as a reference value that is applied to an input terminal of the first comparison unit 1304.

The current detection unit 1312 detects the current $I_1$ of the first switch 1301 and outputs a voltage signal $V_1$ indicating the current $I_1$ of the first switch 1301. The ON time detection unit 1311 obtains the ON time $T_1$ of the first switch 1301 from the driving unit 1303. The voltage signal $V_1$ and the ON time $T_1$ are fed to the first multiplier 1307, and the result of operation of the first multiplier 1307 is used as an actual measurement value that is applied to another input terminal of the first comparison unit 1304.

The first comparison unit 1304 compares the reference value supplied from the multiplication unit 1306 and the actual measurement value supplied from the first multiplier 1307 and supplies the result of comparison to the driving unit 1303.

If the result of comparison at the output terminal of the first comparison unit 1304 is such that the operation output of the first multiplier 1307 is greater than the reference value from the multiplication unit 1306, then the ON time of the first switch 1301 is decreased by the driving unit 1303.

If the result of comparison at the output terminal of the first comparison unit 1304 is such that the operation output of the first multiplier 1307 is less than the reference value from the multiplication unit 1306, then the ON time of the first switch 1301 is increased by the driving unit 1303.

Similarly, the result of operation of the multiplication unit 1306 is used as a reference value that is applied to an input terminal of the second comparison unit 1305.

The current detection unit 1312 detects the current $I_2$ of the second switch 1302 and outputs a voltage signal $V_2$ indicating the current $I_2$ of the second switch 1302. The ON time detection unit 1311 obtains the ON time $T_2$ of the second switch 1302 from the driving unit 1303. The voltage signal $V_2$ and the ON time $T_2$ are fed to the second multiplier 1308, and the result of operation of the second multiplier 1308 is used as an actual measurement value that is applied to another input terminal of the second comparison unit 1305.

The second comparison unit 1305 compares the reference value supplied from the multiplication unit 1306 and the actual measurement value supplied from the second multiplier 1308 and supplies the result of comparison to the driving unit 1303.

If the operation output of the second multiplier 1308 is greater than the reference value from the multiplication unit 1306, then the ON time of the second switch 1302 is decreased by the driving unit 1303.

If the operation output of the second multiplier 1308 is less than the reference value from the multiplication unit 1306, then the ON time of the second switch 1302 is increased by the driving unit 1303.

It is noted that in the embodiment, the first switch 1301 and the second switch 1302 are both N-channel MOS transistors.

Figure 2:
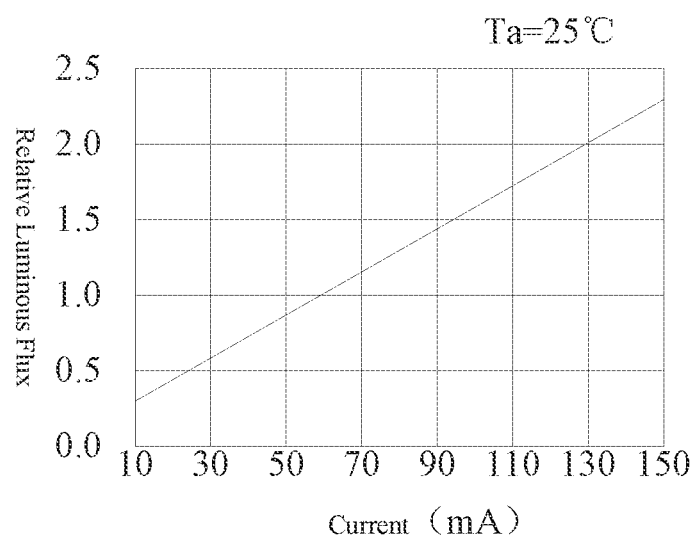
FIG. 2 is a plot of relationship between current of an LED light string of the LED backlight driving circuit shown in FIG. 1 and lumen.

FIG. 2 is a plot of relationship between current of the LED light string assembly 12 and lumen. It is seen from FIG. 2 that the larger the current of the LED light string assembly 12 is, the greater the lumen of the LED light string assembly 12 will be. Due to the deviation of characteristics of LED, with the first LED light string 121 being taken as an example for explanation, in case that the current $I_1$ of the first LED light string 121 is larger at the time when the first switch 1301 is set ON, the driving unit 1303 can be controlled with the output terminal of the first comparison unit 1304 to reduce the duty cycle of the first switch 1301 in order to shorten the ON time of the first switch 1301. Under this condition, the effective current of the first LED light string 121 is correspondingly reduced. On the other hand, when the current $I_1$ of the first LED light string 121 is smaller, the driving unit 1303 can be controlled with the output terminal of the first comparison unit 1304 to increase the duty cycle of the first switch 1301 in order to extend the ON time of the first switch 1301. Under this condition, the effective current of the first LED light string 121 s correspondingly increased. Thus, through controlling the ON times of the first switch 1301 and the second switch 1302 by controlling the driving unit 1303, it is possible to control the effective currents flowing through the first LED light string 121 and the second LED light string 122 so as to ensure identical brightness for each string of LED light.

Further, the voltage supplied by an output terminal of the driving unit 1303 satisfies: Vgs≥Vds+Vt, wherein Vgs is a voltage applied between the gate and the source of a MOS transistor, Vds is a voltage applied between the drain and the source of the MOS transistor, and Vt is a threshold voltage for conduction of the MOS transistor. In the present invention, the driving voltage is made to control the operations of the first switch 1301 and the second switch 1302 within adjustable resistance zone, namely the first switch 1301 and the second switch 1302 have lower conduction impedance when conducted on. Thus, as compared to the prior art, the first switch 1301 and the second switch 1302, when conducted on, show significantly reduced voltage and conduction loss.

In the embodiment, the constant current source 1309 and the driving resistor 16 provide a reference voltage signal Vr by changing the resistance of the resistor 16. The magnitude of the reference voltage signal Vr can be easily set so as to provide different brightness of LED.

In the embodiment, an example that the LED light string assembly 12 comprises first LED light string 121 and second LED light string 122 connected in parallel is given for explanation. It is understood that the number of the LED light strings used in the present invention can be arbitrary number of LED light strings connected in parallel, not limited to only two light strings illustrated above. The number of the LED light string assembly 12 can be increased as desired. For example, a third LED light string, a fourth LED light string . . . an Nth LED light string may be added.

Specifically, when the LED light string 12 further comprises an Nth LED light string, wherein N is a positive integer greater than or equal to 3, the LED backlight driving circuit 10 illustrated in FIG. 1 correspondingly comprises an Nth switch, an Nth multiplier, an Nth current detection resistor, and an Nth comparison unit.

The Nth LED light string is connected in parallel with the first LED light string 121 and the connections among the Nth switch, the Nth multiplier, and the Nth the comparison unit are similar to the connections among the second switch 1302, the second multiplier 1308, and the second comparison unit 1305. In other words, a drain terminal of the Nth switch is connected to a negative terminal of the Nth LED light string; a gate terminal of the Nth switch is connected to the driving unit 1303; a source terminal of the Nth switch is connected to an input terminal of the current detection unit 1312; and the Nth current detection resistor is connected between the source terminal of the Nth switch and ground. An ON time of the Nth switch supplied from the ON time detection unit 1311 and a voltage signal supplied from the current detection unit 1312 to indicate the current of the Nth switch are respectively connected to two input terminals of the Nth multiplier. An output terminal of the Nth multiplier and an output terminal of the multiplication unit 1306 are respectively connected to two input terminals of the Nth comparison unit and an output terminal of the Nth the comparison unit is connected to the driving unit 1303.

By controlling the driving unit 1303 to control the ON time of the Nth switch, it is possible to control an effective current flowing through the Nth LED light string to be the same as the effective currents of the first LED light string 121 and the second LED light string 122 thereby ensuring identical brightness for different LED light strings.

Operations of the Nth switch, the Nth multiplier, and the Nth the comparison unit are identical to those of the second switch 1302, the second multiplier 1308, and the second comparison unit 1305 and thus, related details may refer to the description made above and repeated description will be omitted herein.

It is noted that in the embodiment, the control switch 112 and the first switch 1301, the second switch 1302, and the Nth switch are all N-channel MOS transistors. However, in other embodiments, other types of switch may be used.

Figure 3:
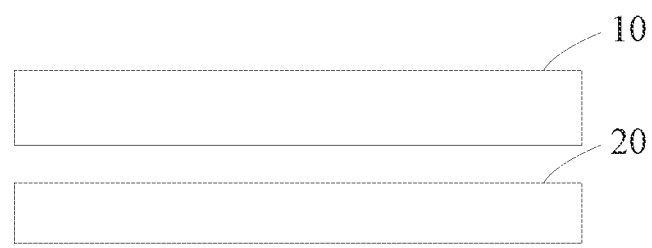
FIG. 3 is a schematic view showing a display device according to the present invention.

Further, the present invention also provides a display device, which is shown in FIG. 3. FIG. 3 is a schematic view of the display device according to the present invention. The display device comprises the above described LED backlight driving circuit 10 and a display panel 20. The display device can be for example a liquid crystal display device, and the LED backlight driving circuit 10 is used as a backlight source that provides as a desired light source for the display panel 20.

In summary, the LED backlight driving circuit and the display device according to the present invention varies the effective current of an LED light string by controlling the ON time of a control switch and switches are put in operation in switching condition of high driving voltage and low impedance so as to reduce the voltage loaded in the switches thereby reducing losses of the switches and at the same time making the brightness of each LED light string identical.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. An LED (Light-Emitting Diode) backlight driving circuit, the LED backlight driving circuit comprising:
    a number of LED light strings connected in parallel;
    a switch module, which comprises the same number of switches as the LED light strings, the switches being arranged to respectively correspond to and connect in series with the LED light strings;
    a power module, which is electrically connected to the LED light strings; and
    a switching control module, which controls currents of the LED light strings; wherein the switching control module comprises:
    a driving unit, which is connected to the switches;
    a current detection unit, which is connected to the switches to detect the currents of the switches;
    an ON time detection unit, which is connected to the driving unit to detect an ON time of each of the switches;
    a reference unit, the reference unit supplying a reference value;
    multipliers of the same number as the LED light strings, each of the multipliers having two input terminals respectively the ON time detection unit and the current detection unit to receive a ON time value of a corresponding one of the switches and a voltage signal indicating the current of the switch;
    comparison units of the same number as the LED light strings, each of the comparison units having two input terminals respectively connected to the reference unit and an output terminal of a corresponding one of the multipliers, each of the comparison units having an output terminal connected to the driving unit, the driving unit controlling the ON time of the switch corresponding to the comparison unit according to an output result of the comparison unit; and
    current detection resistors, the current detection resistors being of a number corresponding to the number of the switches and being respectively connected in series to the switches;
    wherein the reference unit comprises: a constant current source that supplies a constant electrical current, an resistor connected to an input terminal of the constant current source, a period unit that supplies a period value for the driving unit to drive the switches, and a multiplication unit, an output terminal of the constant current source and an output terminal of the period unit being respectively connected to two input terminals of the multiplication unit, the multiplication unit having an output terminal serving as an output terminal of the reference unit and connected to each of the comparison units.

2. The LED backlight driving circuit as claimed in claim 1, wherein the power module comprises: a power supply, an electrical inductor, a control switch, a diode, and a PWM control unit, wherein the electrical inductor has an end connected to the power supply and the electrical inductor has an opposite end connected to a positive terminal of the diode, the diode having a negative terminal connected to the LED light strings; and the control switch has a drain terminal connected between a positive terminal of the diode and the electrical inductor, the control switch having a source terminal that is grounded and a gate terminal that is connected to an output terminal of the PWM control unit.

3. The LED backlight driving circuit as claimed in claim 2, wherein the power module further comprises:
    a minimum voltage detection unit for detecting a minimum voltage of the LED light strings;

an operational amplification circuit; and
a reference voltage unit; wherein an output terminal of the minimum voltage detection unit and an output terminal of the reference voltage unit are respectively connected to two input terminals of the operational amplification circuit, the operational amplification circuit having an output terminal connected to an input terminal of the PWM control unit.

4. An LED (Light-Emitting Diode) backlight driving circuit, the LED backlight driving circuit comprising:
a number of LED light strings connected in parallel;
a switch module, which comprises the same number of switches as the LED light strings, the switches being arranged to respectively correspond to and connect in series with the LED light strings;
a power module, which is electrically connected to the LED light strings; and
a switching control module, which controls currents of the LED light strings;
wherein the switching control module comprises:
a driving unit, which is connected to the switches;
a current detection unit, which is connected to the switches to detect the currents of the switches;
an ON time detection unit, which is connected to the driving unit to detect an ON time of each of the switches;
a reference unit, the reference unit supplying a reference value;
multipliers of the same number as the LED light strings, each of the multipliers having two input terminals respectively the ON time detection unit and the current detection unit to receive a ON time value of a corresponding one of the switches and a voltage signal indicating the current of the switch; and
comparison units of the same number as the LED light strings, each of the comparison units having two input terminals respectively connected to the reference unit and an output terminal of a corresponding one of the multipliers, each of the comparison units having an output terminal connected to the driving unit, the driving unit controlling the ON time of the switch corresponding to the comparison unit according to an output result of the comparison unit.

5. The LED backlight driving circuit as claimed in claim 4, wherein the reference unit comprises:
a constant current source that supplies a constant current;
a resistor, which is connected to an input terminal of the constant current source;
a period unit, which supplies a period value for the driving unit to drive the switches; and
a multiplication unit, an output terminal of the constant current source and an output terminal of the period unit being respectively connected to two input terminals of the multiplication unit, the multiplication unit having an output terminal serving as an output terminal of the reference unit and connected to each of the comparison units.

6. The LED backlight driving circuit as claimed in claim 4, wherein the LED backlight driving circuit further comprises current detection resistors, the current detection resistors being of a number corresponding to the number of the switches and being respectively connected in series to the switches.

7. The LED backlight driving circuit as claimed in claim 6, wherein the switches comprise N-channel MOS transistors.

8. The LED backlight driving circuit as claimed in claim 4, wherein the power module comprises: a power supply, an electrical inductor, a control switch, a diode, and a PWM control unit, wherein the electrical inductor has an end connected to the power supply and the electrical inductor has an opposite end connected to a positive terminal of the diode, the diode having a negative terminal connected to the LED light strings; and the control switch has a drain terminal connected between a positive terminal of the diode and the electrical inductor, the control switch having a source terminal that is grounded and a gate terminal that is connected to an output terminal of the PWM control unit.

9. The LED backlight driving circuit as claimed in claim 8, wherein the power module further comprises:
a minimum voltage detection unit for detecting a minimum voltage of the LED light strings;
an operational amplification circuit; and
a reference voltage unit; wherein an output terminal of the minimum voltage detection unit and an output terminal of the reference voltage unit are respectively connected to two input terminals of the operational amplification circuit, the operational amplification circuit having an output terminal connected to an input terminal of the PWM control unit.

10. A display device, which comprises a display panel and an LED (Light-Emitting Diode) backlight driving circuit, the LED backlight driving circuit comprising:
a number of LED light strings connected in parallel;
a switch module, which comprises the same number of switches as the LED light strings, the switches being arranged to respectively correspond to and connect in series with the LED light strings;
a power module, which is electrically connected to the LED light strings; and
a switching control module, which controls currents of the LED light strings;
wherein the switching control module comprises:
a driving unit, which is connected to the switches;
a current detection unit, which is connected to the switches to detect the currents of the switches;
an ON time detection unit, which is connected to the driving unit to detect an ON time of each of the switches;
a reference unit, the reference unit supplying a reference value;
multipliers of the same number as the LED light strings, each of the multipliers having two input terminals respectively the ON time detection unit and the current detection unit to receive a ON time value of a corresponding one of the switches and a voltage signal indicating the current of the switch; and
comparison units of the same number as the LED light strings, each of the comparison units having two input terminals respectively connected to the reference unit and an output terminal of a corresponding one of the multipliers, each of the comparison units having an output terminal connected to the driving unit, the driving unit controlling the ON time of the switch corresponding to the comparison unit according to an output result of the comparison unit.

11. The display device as claimed in claim 10, wherein the reference unit comprises:
a constant current source that supplies a constant current;
a resistor, which is connected to an input terminal of the constant current source;
a period unit, which supplies a period value for the driving unit to drive the switches; and
a multiplication unit, an output terminal of the constant current source and an output terminal of the period unit being respectively connected to two input terminals of the multiplication unit, the multiplication unit having an output terminal serving as an output terminal of the reference unit and connected to each of the comparison units.

12. The display device as claimed in claim 10, wherein the LED backlight driving circuit further comprises current detection resistors, the current detection resistors being of a number corresponding to the number of the switches and being respectively connected in series to the switches.

13. The display device as claimed in claim 12, wherein that the switches comprise N-channel MOS transistors.

14. The display device as claimed in claim 10, wherein the power module comprises: a power supply, an electrical inductor, a control switch, a diode, and a PWM control unit, wherein the electrical inductor has an end connected to the power supply and the electrical inductor has an opposite end connected to a positive terminal of the diode, the diode having a negative terminal connected to the LED light strings; and the control switch has a drain terminal connected between a positive terminal of the diode and the electrical inductor, the control switch having a source terminal that is grounded and a gate terminal that is connected to an output terminal of the PWM control unit.

15. The display device as claimed in claim 14, wherein the power module further comprises:
a minimum voltage detection unit for detecting a minimum voltage of the LED light strings;
an operational amplification circuit; and
a reference voltage unit; wherein an output terminal of the minimum voltage detection unit and an output terminal of the reference voltage unit are respectively connected to two input terminals of the operational amplification circuit, the operational amplification circuit having an output terminal connected to an input terminal of the PWM control unit.

16. The display device as claimed in claim 10, wherein the display device comprises a liquid crystal display device.

* * * * *